(12) United States Patent
Huang et al.

(10) Patent No.: US 11,651,604 B2
(45) Date of Patent: May 16, 2023

(54) WORD RECOGNITION METHOD, APPARATUS AND STORAGE MEDIUM

(71) Applicant: BOE TECHNOLOGY GROUP CO., LTD., Beijing (CN)

(72) Inventors: Guangwei Huang, Beijing (CN); Yue Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 213 days.

(21) Appl. No.: 17/263,418

(22) PCT Filed: Mar. 31, 2020

(86) PCT No.: PCT/CN2020/082566
§ 371 (c)(1),
(2) Date: Jan. 26, 2021

(87) PCT Pub. No.: WO2021/196013
PCT Pub. Date: Oct. 7, 2021

(65) Prior Publication Data
US 2022/0036112 A1 Feb. 3, 2022

(51) Int. Cl.
*G06T 3/40* (2006.01)
*G06V 30/19* (2022.01)
*G06T 7/70* (2017.01)
*G06V 10/24* (2022.01)
*G06V 30/148* (2022.01)

(52) U.S. Cl.
CPC .......... *G06V 30/19173* (2022.01); *G06T 3/40* (2013.01); *G06T 7/70* (2017.01); *G06V 10/24* (2022.01); *G06V 30/153* (2022.01); *G06T 2207/20084* (2013.01)

(58) Field of Classification Search
CPC ...... G06V 30/153; G06V 10/24; G06V 10/44; G06V 10/22; G06V 30/10; G06T 7/70; G06T 3/40; G06T 2207/20084
See application file for complete search history.

(56) References Cited

U.S. PATENT DOCUMENTS

2008/0131000 A1\* 6/2008 Tsai .................. G06V 30/158
382/182
2014/0161365 A1 6/2014 Acharya et al.
(Continued)

FOREIGN PATENT DOCUMENTS

| CN | 104239861 | 12/2014 |
| CN | 106951896 | 7/2017 |
| CN | 107516096 | 12/2017 |

(Continued)

OTHER PUBLICATIONS

International Search Report for corresponding PCT Application No. PCT/CN2020/082566 dated Dec. 25, 2020, 9 pages.

*Primary Examiner* — Syed Haider
(74) *Attorney, Agent, or Firm* — Dority & Manning, P.A.

(57) ABSTRACT

The present invention provides a word recognition method. The method includes: acquiring an image of a word to be recognized; recognizing edges of each character of the word to be recognized from the image of the word to be recognized; determining a geometric position of the word to be recognized; stretching the geometric position of the word to be recognized to a horizontal position; and recognizing the word to be recognized in the horizontal position.

18 Claims, 5 Drawing Sheets

(56) References Cited

U.S. PATENT DOCUMENTS

2018/0005058 A1* 1/2018 Yang ................ G06V 30/18076
2019/0311227 A1* 10/2019 Kriegman ............ G06V 10/242

FOREIGN PATENT DOCUMENTS

| CN | 107516096 A | * | 12/2017 | | |
|----|-------------|---|---------|---|---|
| CN | 108647681 | | 10/2018 | | |
| CN | 108985137 | | 12/2018 | | |
| CN | 108985137 A | * | 12/2018 | ............... | G06K 9/00 |
| CN | 110321755 | | 10/2019 | | |

* cited by examiner

201 — The edges of each character of the word to be recognized are determined by using a maximally stable extremal region (MSER) algorithm.

202 — An initial bounding box of the character is determined according to the edges of the character, and a central point of the initial bounding box is used as a rotatory central point to determine a position of a main axis; the main axis is continuously rotated and translated to determine boundaries, and areas of regions enclosed by the boundaries are compared to obtain a minimum bounding box; a coordinate system is established with any vertex of the image of the word to be recognized as an origin, a horizontal direction as an x axis, and a vertical direction as a y axis; coordinates of four vertexes of the minimum bounding box are determined, edges in height and edges in width of the minimum bounding box are determined according to the coordinates of the four vertexes, and an angle between one of the edges in width and the x axis is used as an orientation angle of the character; and the geometric position of the word to be recognized is determined according to orientation angles of all characters 203 — A central point of the minimum bounding box is used as a central point of the character, and central points of all characters are connected in order from left to right to obtain a central line of text; a plurality of central points are sampled at equal intervals on the central line of the text, and a point on each of two edges in height in an orientation of a character corresponding to a sampled point is selected as a base point; and a thin-plate spline (TPS) interpolation transformation matrix is calculated based on base points, and bilinear interpolation sampling is performed to stretch the geometric position of the word to be recognized to the horizontal position

FIG. 3

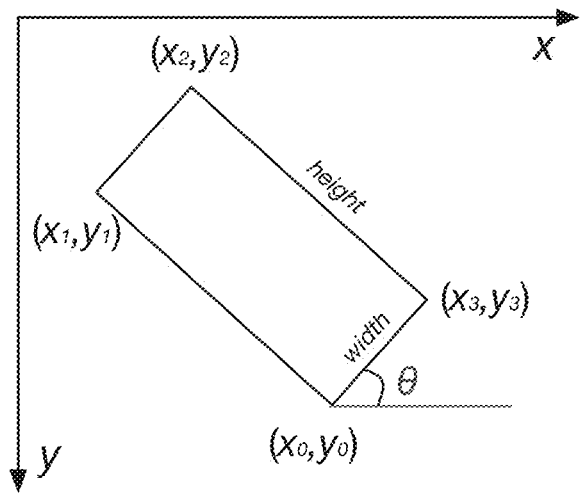

FIG. 4

WORD RECOGNITION METHOD, APPARATUS AND STORAGE MEDIUM

CROSS-REFERENCE TO RELATED APPLICATIONS

This application is a national phase entry under 35 USC 371 of International Patent Application No. PCT/CN2020/082566 filed on Mar. 31, 2020, which is incorporated herein by reference in its entirety.

TECHNICAL FIELD

The present invention relates to the field of text recognition technologies, and in particular, to a word recognition method, an apparatus and a storage medium.

BACKGROUND

A translation pen is a kind of tool for recognizing words when people read materials or books. Some translation pens (such as point translation pens) perform very well in recognizing clear and flat text. However, in a case where slanted, perspective, or curved text makes words relatively illegible (for example, in application scenarios of point translation pens), an accuracy of text recognition needs to be further improved.

SUMMARY

An aspect of embodiments of the present invention provides a word recognition method, which includes the following steps:
acquiring an image of a word to be recognized;
recognizing edges of each character of the word to be recognized from the image of the word to be recognized; determining a geometric position of the word to be recognized, and stretching the geometric position of the word to be recognized to a horizontal position; and
recognizing the word to be recognized in the horizontal position.

Another aspect of the embodiments of the present invention provides an electronic apparatus, which includes a memory, a processor, and a computer program that is stored on the memory and executable on the processor. When the processor executes the program, the following word recognition method is implemented, including:
acquiring an image of a word to be recognized;
recognizing edges of each character of the word to be recognized from the image of the word to be recognized, determining a geometric position of the word to be recognized, and stretching the geometric position of the word to be recognized to a horizontal position; and
recognizing the word to be recognized in the horizontal position.

Yet another aspect of the embodiments of the present invention provides a non-volatile computer-readable storage medium having stored a computer program thereon. When the program is executed by a processor, the following word recognition method is implemented, including:
acquiring an image of a word to be recognized;
recognizing edges of each character of the word be recognized from the image of the word be recognized, determining a geometric position of the word be recognized, and stretching the geometric position of the word be recognized to a horizontal position; and
recognizing the word be recognized in the horizontal position.

Additional aspects and advantages of the present invention will be partially described in the following descriptions, part of which will become apparent from the following description, or will be understood through practice of the present invention.

BRIEF DESCRIPTION OF THE DRAWINGS

The above and/or additional aspects and advantages of the present invention will become obvious and easy to understand from the following descriptions of embodiments in conjunction with accompanying drawings, in which:

FIG. 3 is a schematic flowchart of text correction as described in step 102, in accordance with embodiments of the present invention;

FIG. 4 is a schematic diagram of determining a geometric position of a word to be recognized, in accordance with embodiments of the present invention;

DETAILED DESCRIPTION

Figure 1:
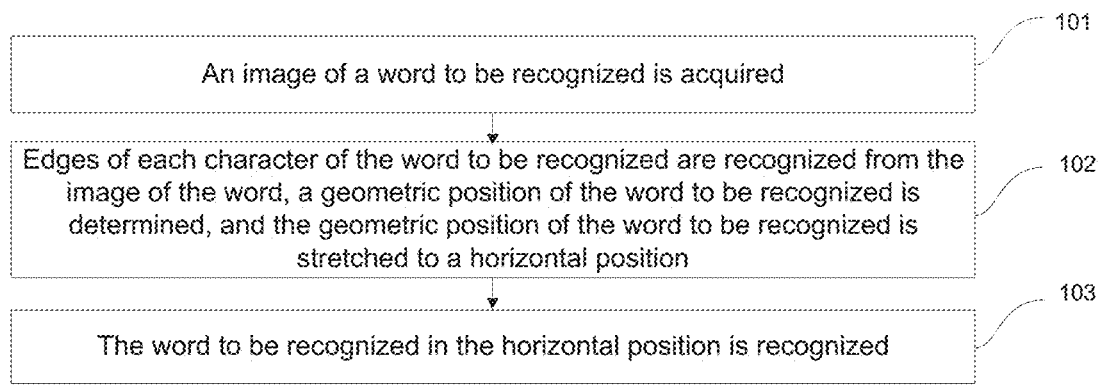
FIG. 1 is a schematic flowchart of a word recognition method, in accordance with embodiments of the present invention.

Embodiments of the present invention are described below in detail. Examples of the embodiments are illustrated in accompanying drawings. Same or similar reference numerals throughout the accompanying drawings indicate same or similar elements, or elements with same or similar functions. The embodiments described below by referring to the accompanying drawings are exemplary, and are intended to explain the present invention, but should not be construed as limitations on the present invention.

The word recognition method and the apparatus of the embodiments of the present invention are described below with reference to the accompanying drawings.

FIG. 1 is a schematic flowchart of a word recognition method, in accordance with embodiments of the present invention.

The word recognition method of the embodiments of the present application may be applied to translation scenarios, for example, may be applied to a recognition function of a translation pen. The following embodiments are described by using a point translation pen as an example.

In a case where an optical character recognition (OCR) technology is used for recognizing printed or handwritten text (such as words), if the text is slanted or curved, recognition may be inaccurate and the recognition effect may be poor.

In order to address this problem, embodiments of the present invention provide a word recognition method. When a translation pen is used to recognize words, words that are not in a horizontal position, such as slanted or curved words, are stretched to the horizontal position and then recognized. In this way, it may be possible to effectively improve the accuracy and recognition effect of the word recognition, and thereby enhance the user experience. As shown in FIG. 1, the word recognition method includes the following steps 101 to 103.

In step 101, an image of a word to be recognized is acquired.

The word recognition method provided by the embodiments of the present invention may be performed by a processor. The processor may be provided in an electronic device, such as a terminal or a server of a cloud provided by the embodiments of the present invention. Specific implementations of the terminal include translation apparatuses lke point translation pens and point reading machines, which are not limited in the present invention.

For example, in an application scenario of the point translation pen, an image of a word to be recognized provided by a scanning head of the point translation pen may be obtained.

Figure 2:
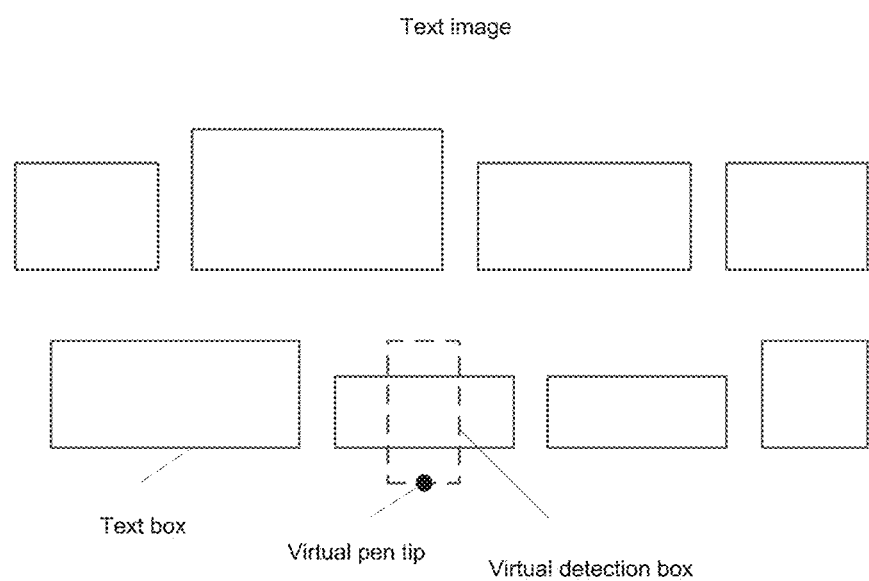
FIG. 2 is a schematic diagram of acquiring an image of a word to be recognized, in accordance with embodiments of the present invention.

In specific applications, a tip of the point translation pen is used by a user to point to a word that needs to be translated. Since a relative position of the pen tip and a camera is fixed, a relative position of the pen tip in the image is also fixed. Therefore, in this embodiment, the following method may be adopted to acquire an image of a word to be recognized. The method includes:

setting a fixed-size rectangular region as a virtual pen tip according to a size of the word in the image with a position of a pen tip as a central point of a bottom edge, wherein the virtual pen tip is as shown in FIG. 2, and the fixed-size rectangular region is a virtual detection box shown in FIG. 2;

calculating an overlapping area between the fixed-size rectangular region and each of text boxes that are detected, wherein the text boxes are as shown in FIG. 2; and finding a text box with an overlapping area that occupies a largest proportion of the fixed-size rectangular region, and using a word in the text box as the word to be recognized to obtain the image of the word to be recognized.

In step 102, edges of each character of the word to be recognized are recognized from the image of the word, a geometric position of the word to be recognized is determined, and the geometric position of the word to be recognized is stretched to a horizontal position.

The geometric position may be a slanted position, a curved position or a horizontal position. Determining the geometric position of the word may be interpreted as determining whether the word to be recognized in the image is slanted, curved or horizontal.

If the word to be recognized is horizontal and legible in the image, the word may be directly recognized. But if the word is slanted, perspective or curved in the image, there may be such problems as inaccurate word recognition or low recognition efficiency in practical applications. Therefore, in the embodiments of the present invention, words that are not in the horizontal position such as slanted and curved words will be stretched to be in the horizontal position when being recognized. In this way, the accuracy and recognition effect of the word recognition may be improved.

In step 103, the word to be recognized in the horizontal position is recognized.

In summary, in the word recognition method of the embodiments of the present invention, when a translation pen recognizes a word, the translation pen stretches the word that is not in the horizontal position such as a slanted or curved word to the horizontal position, and then recognizes the word. In this way, it may be possible to effectively improve the accuracy and the recognition effect of the word recognition, and thereby enhance the user experience. The present invention solves the technical problem in the prior art that the accuracy of text recognition needs to be further improved in a case where slanted, perspective, or curved text makes words relatively illegible (for example, in the application scenarios of point translation pens).

Figure 8:
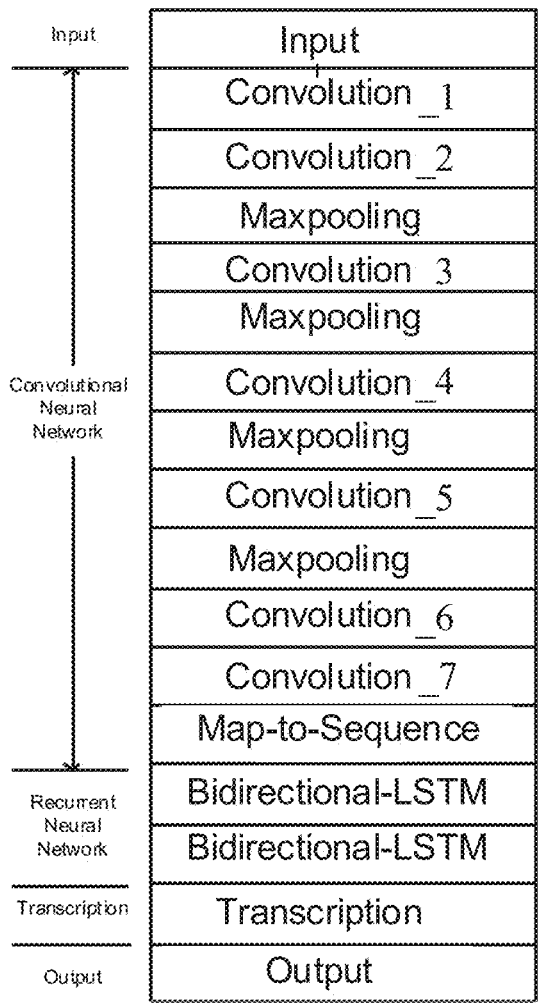
FIG. 8 is a schematic structural diagram of a CRNN algorithm, in accordance with the related art.

In the application scenarios of point translation pens, if paper is made from flexible materials, text in an acquired image may be slanted, perspective or curved. In practical applications, there may be such problems as inaccurate word recognition or low recognition efficiency. Therefore, in order to improve the accuracy of word recognition, in the embodiments of the present invention, words that are not in the horizontal position such as slanted or curved words are first stretched to be in the horizontal position. A text correction process in step 102 will be elaborated below. As shown in FIG. 8, step 102 specifically includes steps 201 to 203.

In step 201, the edges of each character of the word to be recognized are determined by using a maximally stable external region (MSER) algorithm.

In the embodiments of the present invention, the edges of each character may be determined by other algorithms, such as a projection method or a character detection algorithm based on machine learning or deep learning. The MSER algorithm is only used as an example herein and the embodiments of the present invention is not limited thereto.

It can be understood that, when a word to be recognized including one or more characters is determined, the MSER algorithm is adopted to determine edges of a location of each character of the word to be recognized or edges of locations of characters whose ratio of quantity exceeds a preset threshold (for example, characters whose ratio of quantity exceeds 80% in a word).

In step 202, an initial bounding box of the character is determined according to the edges of the character, and a central point of the initial bounding box is used as a rotatory central point to determine a position of a main axis; the main axis is continuously rotated and translated to determine boundaries, and areas of regions enclosed by the boundaries are compared to obtain a minimum bounding box; a coordinate system is established with any vertex of the image of the word to be recognized as an origin, a horizontal direction as an x axis, and a vertical direction as a y axis; coordinates of four vertexes of the minimum bounding box are determined, edges in height and edges in width of the minimum bounding box are determined according to the coordinates of the four vertexes, and an angle between one of the edges in width and the x axis is used as an orientation angle of the character; and the geometric position of the word to be recognized is determined according to orientation angles of all characters.

For example, as shown in FIG. 4, a coordinate system is established with an upper left point of the entire image as an origin, the horizontal direction as the x axis, and the vertical direction as they axis. In this coordinate system, coordinates of four vertexes of the minimum bounding box may be obtained as (x0, y0), (x1, y1), (x2, y2) and (x3, y3), and then edges in height and edges in width of the minimum bounding box may be determined. An angle θ between an edge in width and the x axis (the horizontal direction) is used as an orientation angle of the character, and then an orientation of the character may be determined. Then, whether the character is slanted or horizontal may be determined according to the orientation angle of the character, and whether the word is slanted, curved or horizontal on the whole may be determined according to the orientation of each character. Thus, the geometric position of the word may be determined.

In step 203, a central point of the minimum bounding box is used as a central point of the character, and central points of all characters are connected in order from left to right to obtain a central line of text; a plurality of central points are sampled at equal intervals on the central line of the text, and a point on each of two edges in height in an orientation of a character corresponding to a sampled point is selected as a base point; and a thin-plate spline (TPS) interpolation transformation matrix is calculated based on base points, and bilinear interpolation sampling is performed to stretch the geometric position of the word to be recognized to the horizontal position.

Figure 5:
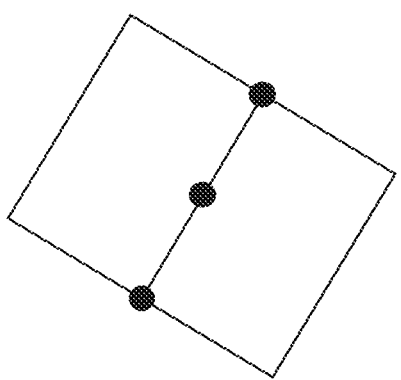
FIG. 5 is a schematic diagram of selecting base points, in accordance with embodiments of the present invention.

For example, when the base points are selected, as shown in FIG. 5, two points are selected as follows: taking a midpoint on a bottom edge and drawing a line perpendicular to the bottom edge, the line passing through the central point of the rectangle and intersects a top edge at one point. The two points are on the bottom and top edges of the rectangle, respectively. All the sampled points are selected in this way to obtain the base points. Of course, more points may be selected on this line. The embodiments of the present invention are described by taking two points as an example, which is not specifically limited herein.

Figure 6A:
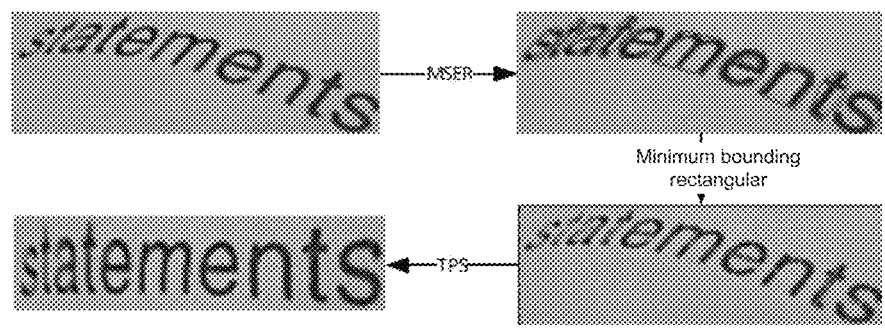
FIG. 6a shows an example of text correction, in accordance with embodiments of the present invention.
Figure 6B:
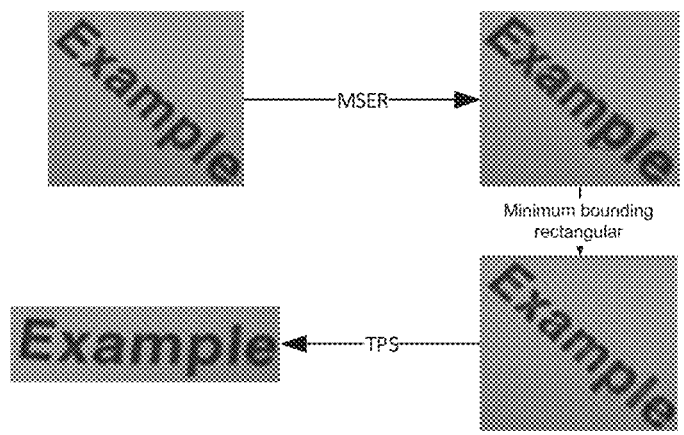
FIG. 6b shows another example of text correction, in accordance with embodiments of the present invention.

As per the method shown in FIG. 3, for example, as shown in FIG. 6a, a word "statements" in an image is slanted and curved, and as shown in FIG. 6b, a word "Example" in an image is slanted. FIG. 6a is taken as an example to illustrate the text correction process, as seen below.

In step 201, for example, edges of each character (each letter is a character) of the word "statements" are determined first by using the MSER algorithm. In step 202, for example, a central point and an orientation of each character of the word "statements" are determined according to the method in step 202. In step 203, for example, central points of multiple characters are connected in order to obtain a central line of the word "statements"; five points are sampled at equal intervals on the central line; for each of the five points, two points are selected along the orientation of the character at half the height of the character (that is, midpoints of the bottom edge and the top edge of the rectangle where each point is located); ten points that are selected along the orientations of the characters according to the five points sampled at equal intervals are the base points; at last, a TPS interpolation transformation matrix is calculated after the base points are obtained, and bilinear interpolation sampling is performed to obtain a corrected "statements" image.

It can be seen from text images before and after the correction in FIG. 6a that, in the embodiments of the present invention, slanted, perspective and curved words may be stretched to be in their respective horizontal positions. Meanwhile, the image is made smoother during a stretching process, and the words are less prone to distortion due to stretching.

In the embodiments of the present invention, by adopting the text correction method, it may be possible to effectively stretch slanted, perspective and curved words to be in their respective horizontal positions. Meanwhile, image may become smoother during the stretching process, and words are less prone to distortion due to stretching. Therefore, reliability of text correction may be improved.

Figure 7:
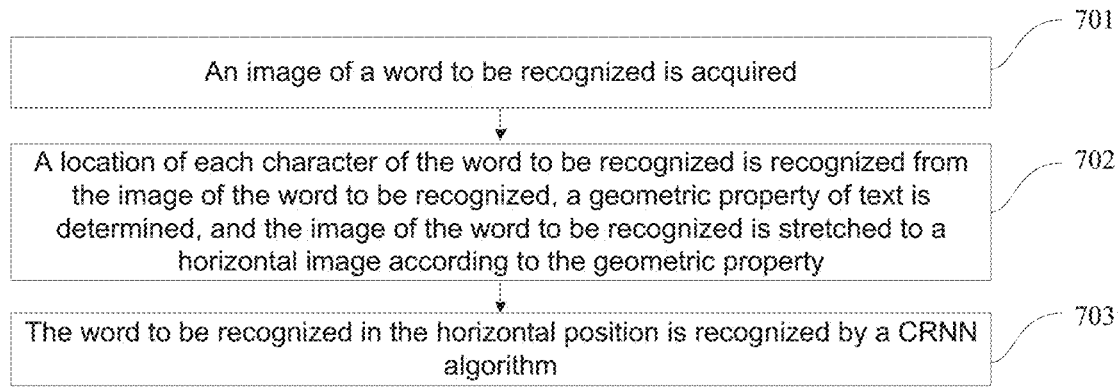
FIG. 7 is a schematic flowchart of another word recognition method, in accordance with embodiments of the present invention.

Based on the above embodiment, this embodiment provides another word recognition method to explain how to recognize the word after image correction. This embodiment and the previous embodiment focus on different content in descriptions thereof, and reference may be made to each other regarding undescribed steps of the embodiments. In this embodiment, as shown in FIG. 7, the word recognition method includes the following steps 701 to 703.

In step 701, an image of a word to be recognized is acquired.

In step 702, a location of each character of the word to be recognized is recognized from the image of the word to be recognized, a geometric property of text is determined, and the image of the word to be recognized is stretched to a horizontal image according to the geometric property.

As for steps 701 and 702, descriptions can be referred to those of steps 101 and 102. In order to avoid redundancy, details are not repeated herein.

In step 703, the word to be recognized in the horizontal position is recognized by a CRNN algorithm.

In the embodiments of the present invention, by improving an existing CRNN algorithm structure, it may be possible to effectively enhance a computing efficiency of the algorithm, and thus further improve the efficiency and accuracy of word recognition. Details are described below.

Firstly, as shown in FIG. 8, the existing CRNN algorithm structure includes a convolutional neural network layer, a recurrent neural network layer and a transcription layer (Transcription). Specific details are as below.

The convolutional neural network layer is composed of first to seventh convolution layers (Convolutions 1 to 7 in the figure), a maxpooling layer (Maxpooling), and a customized network layer (Map-to-Sequence). Image characteristics are extracted through the convolution layers. The customized network layer is a "bridge" between the convolutional neural network layer and the recurrent neural network layer.

The recurrent neural network layer includes two bidirectional long short-term memory (Bi-LSTM) layers that are used for predicting characteristic vector sequences of the word to be recognized so as to obtain prediction results. Since both forward information and backward information of text sequences are beneficial to predicting sequences, two Bi-LSTM layers are adopted to learn a semantic relationship among text sequences.

The transcription layer is used for decoding the prediction results into characters, and removing spacing characters and repetitive characters so as to obtain recognition results of the word to be recognized.

Figure 9:
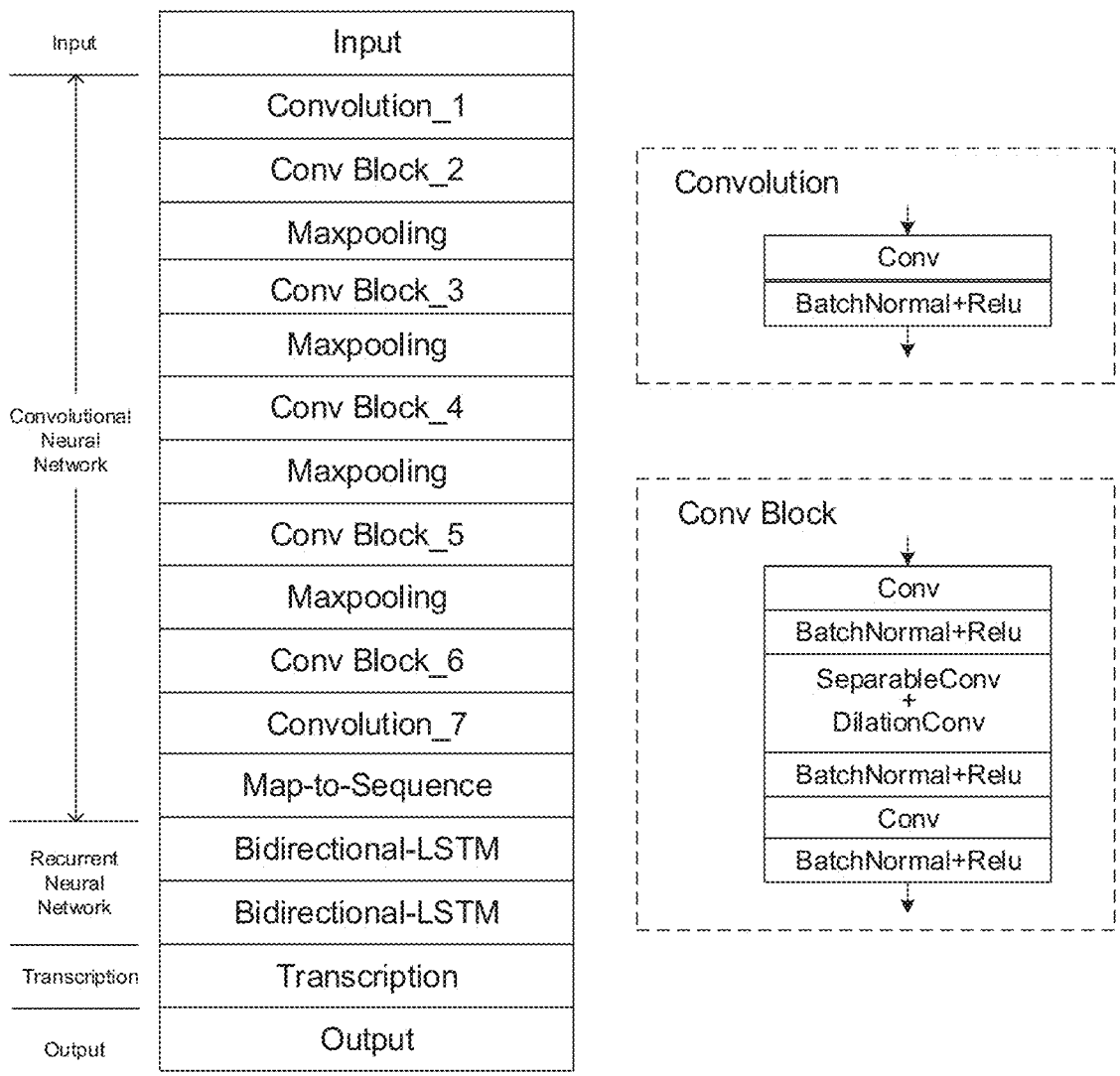
FIG. 9 is a schematic structural diagram of an improved CRNN algorithm, in accordance with embodiments of the present invention.

In the embodiments of the present invention, the existing CRNN algorithm structure as shown in FIG. 8 is improved, and the second to sixth convolution layers are replaced by designed convolution blocks. The improved algorithm is as shown in FIG. 9, which is different from the existing CRNN algorithm in terms of a structure of the convolutional neural network layer, and is the same as the existing CRNN algorithm in terms of structures of the recurrent neural network layer and the transcription layer. In order to avoid redundancy, details are not repeated herein. As shown in FIG. 9, the convolutional neural network layer is composed of convolution layers (Convolutions), convolution blocks (Conv Blocks) maxpooling layers (Maxpoolings) and a customized network layer (Map-to-Sequence). The convolutional neural network layer is used for extracting image characteristics to be recognized. The convolution layers include convolution (Conv), batch normalization and activation function (Relu).

In a logical order, the convolutional neural network layer sequentially includes a first convolution layer, a first convolution block, a first maxpooling layer, a second convolution block, a second maxpooling layer, a third convolution block, a third maxpooling layer, a fourth convolution block, a fourth maxpooling layer, a fifth convolution block, a second convolution layer, and a customized network layer. In a logical order, a convolution block sequentially includes a first convolution sub-layer (Conv), a first batch normalization and activation sub-layer (BatchNormal+Relu), a depth separable convolution sub-layer based on dilation convolution (SeparableConv+DilationCov), a second batch normalization and activation sub-layer (BatchNormal+Relu), a second convolution sub-layer (Conv), and a third batch normalization and activation sub-layer (BatchNormal+Relu).

With extraction of characteristics sequences of the word to be recognized as an example, the existing CRNN algorithm extracts characteristic vector sequences of the word to be recognized only through the convolution layer. However, in the embodiments of the present invention, image characteristics are extracted through the convolution layer and the convolution blocks. Compared with the existing CRNN algorithm, the embodiments of the present invention effectively expand a perception vision of the algorithm, improve an ability of the algorithm in determining similar characters, improve the recognition accuracy of the algorithm, reduce amount of calculation, and enhance calculation efficiency. Therefore, the algorithm may be more suitable for practical application scenarios of translation pens. Moreover, the embodiments of the present invention may improve the efficiency and the accuracy of word recognition when the improved CRNN algorithm is used for recognizing the word to be recognized.

Further, before recognizing the word to be recognized in the horizontal position by the CRNN algorithm, the method further includes: scaling the image of the word to be recognized in the horizontal position to a preset height and a preset width. The preset height and the preset width may be set according to actual situations, and are not limited herein.

In summary, by using the improved CRNN algorithm to recognize words, the word recognition method provided in the embodiments of the present invention may effectively improve the accuracy and the recognition speed of word recognition, and thereby reduce a time required for recognition and improve recognition efficiency.

In order to implement the above embodiments, embodiments of the present invention further provides an electronic apparatus.

The electronic apparatus includes a memory, a processor, and a computer program that is stored on the memory and executable on the processor. When the processor executes the program, the following word recognition method is implemented, including:

acquiring an image of a word to be recognized;

recognizing edges of each character of the word to be recognized from the image of the word to be recognized, determining a geometric position of the word to be recognized, and stretching the geometric position of the word to be recognized to a horizontal position; and recognizing the word to be recognized in the horizontal position.

Optionally, recognizing the edges of each character of the word to be recognized from the image of the word to be recognized includes:

determining the edges of each character of the word to be recognized by a maximally stable extremal region (MSER) algorithm.

Further, determining the geometric position of the word to be recognized includes:

determining an initial bounding box of the character according to the edges of the character, and determining a position of a main axis by using a central point of the initial bounding box as a rotatory central point;

continuously rotating and translating the main axis to determine boundaries, and comparing areas of regions enclosed by the boundaries to obtain a minimum bounding box;

establishing a coordinate system with any vertex of the image of the word to be recognized as an origin, a horizontal direction as an x axis, and a vertical direction as a y axis;

determining coordinates of four vertexes of the minimum bounding box in the coordinate system, determining edges in height and edges in width of the minimum bounding box according to the coordinates of the four vertexes, and using an angle between one of the edges in width and the x axis as an orientation angle of the character; and determining the geometric position of the word to be recognized according to orientation angles of all characters.

Further, stretching the geometric position of the word to be recognized to the horizontal position includes:

with a central point of the minimum bounding box as a central point of the character, connecting central points of all characters in order from left to right to obtain a central line of text;

sampling a plurality of central points at equal intervals on the central line of the text, and selecting a point on each of two edges in height in an orientation of a character corresponding to a sampled point as a base point; and calculating a TPS interpolation transformation matrix based on base points, and performing bilinear interpolation sampling to stretch the geometric position of the word to the horizontal position.

Further, recognizing the word to be recognized in the horizontal position includes:

recognizing the word to be recognized in the horizontal position by a CRNN algorithm.

Further, the program, when being executed by the processor, further performs: before recognizing the word to be recognized in the horizontal position by the CRNN algorithm, scaling the image of the word to be recognized in the horizontal position to a preset height and a preset width.

Further, the CRNN algorithm includes:

a convolutional neural network layer. The convolutional neural network layer includes first and second convolution layers, first to fifth convolution blocks, first to fourth maxpooling layers, and a customized network layer. Characteristic vector sequences of the word to be recognized in the scaled image are extracted through the convolution layers and convolution blocks.

Further, in a logical order, the convolutional neural network layer sequentially includes a first convolution layer, a first convolution block, a first maxpooling layer, a second convolution block, a second maxpooling layer, a third convolution block, a third maxpooling layer, a fourth convolution block, a fourth maxpooling layer, a fifth convolution block, a second convolution layer, and a customized network layer.

Further, each convolution block is composed of first to second convolution sub-layers (Convus), first to third batch normalization and activation sub-layer (BatchNormal+Relus), and a depth separable convolution sub-layer based on dilation convolution (SeparableConv+DilationConv).

Further, in a logical order, the convolution block sequentially includes a first convolution sub-layer (Conv), a first batch normalization and activation sub-layer (BatchNormal+Relu), a depth separable convolution sub-layer based on dilation convolution (SeparableConv+DilationConv), a second batch normalization and activation sub-layer (BatchNormal+Relu), a second convolution sub-layer (Conv), and a third batch normalization and activation sub-layer (BatchNormal+Relu).

Further, the CRNN algorithm also includes:

a recurrent neural network layer. The recurrent neural network layer includes two bidirectional-LSTM layers that are used for predicting characteristic vector sequences of the word to be recognized so as to obtain prediction results.

Further, the CRNN algorithm also includes:

a transcription layer for decoding the prediction results into characters, and removing spacing characters and repetitive characters so as to obtain recognition results of the word to be recognized.

Further, acquiring the image of the word to be recognized includes:

setting a fixed-size rectangular region as a virtual pen tip according to a size of the word in the image with a position of a pen tip as a central point of a bottom edge;

calculating an overlapping area between the fixed-size rectangular region and each of text boxes that are detected; and finding a text box with an overlapping area that occupies a largest proportion of the fixed-size rectangular region, and using a word in the text box as the word to be recognized to obtain the image of the word to be recognized.

It will be noted that, the foregoing explanations of the embodiments of the word recognition method also apply to the electronic apparatus of the embodiments, and details are not repeated herein.

When a translation pen adopting the electronic apparatus of the embodiments of the present invention is used to recognize words, words that are not in the horizontal position, such as slanted or curved words, are stretched to the horizontal position, and then recognized. In this way, it may be possible to effectively improve the accuracy and the recognition effect of the word recognition, and thereby enhance the user experience. The present invention solves the technical problem in the prior art that the accuracy of text recognition needs to be further improved in a case where slanted, perspective or curved text makes words relatively illegible (for example, in the application scenarios of point translation pens).

In order to implement the above embodiments, embodiments of the present invention further provides a non-volatile computer-readable storage medium.

The non-volatile computer-readable storage medium has stored thereon a computer program. When the program is executed by a processor, the following word recognition method is implemented, including:

acquiring an image of a word to be recognized;

recognizing edges of each character of the word to be recognized from the image of the word to be recognized, determining a geometric position of the word to be recognized, and stretching the geometric position of the word to be recognized to a horizontal position; and recognizing the word to be recognized in the horizontal position.

Optionally, recognizing the edges of each character of the word to be recognized from the image of the word to be recognized includes:

determining the edges of each character of the word to be recognized by a maximally stable extremal region (MSER) algorithm.

Further, determining the geometric position of the word to be recognized includes:

determining an initial bounding box of the character according to the edges of the character, and determining a position of a main axis by using a central point of the initial bounding box as a rotatory central point;

continuously rotating and translating the main axis to determine boundaries, and comparing areas of regions enclosed by the boundaries to obtain a minimum bounding box;

establishing a coordinate system with any vertex of the image of the word to be recognized as an origin, a horizontal direction as an x axis, and a vertical direction as a y axis;

determining coordinates of four vertexes of the minimum bounding box in the coordinate system, determining edges in height and edges in width of the minimum bounding box according to the coordinates of the four vertexes, and using an angle between one of the edges in width and the x axis as an orientation angle of the character; and determining the geometric position of the word to be recognized according to orientation angles of all characters.

Further, stretching the geometric position of the word to be recognized to the horizontal position includes:

with a central point of the minimum bounding box as a central point of the character, connecting central points of all characters in order from left to right to obtain a central line of text;

sampling a plurality of central points at equal intervals on the central line of the text, and selecting a point on each of two edges in height in an orientation of a character corresponding to a sampled point as a base point; and calculating a TPS interpolation transformation matrix based on base points, and performing bilinear interpolation sampling to stretch the geometric position of the word to the horizontal position.

Further, recognizing the word to be recognized in the horizontal position includes:

recognizing the word to be recognized in the horizontal position by a CRNN algorithm.

Further, the program, when being executed by the processor, further performs: before recognizing the word to be recognized in the horizontal position by the CRNN algorithm, scaling the image of the word to be recognized in the horizontal position to a preset height and a preset width.

Further, the CRNN algorithm includes:

a convolutional neural network layer. The convolutional neural network layer includes first and second convolution layers, first to fifth convolution blocks, first to fourth maxpooling layers, and a customized network layer Characteristic vector sequences of the word to be recognized in the scaled image are extracted through the convolution layers and convolution blocks.

Further, in a logical order, the convolutional neural network layer sequentially includes a first convolution layer, a first convolution block, a first maxpooling layer, a second convolution block, a second maxpooling layer, a third convolution block, a third maxpooling layer, a fourth convolution block, a fourth maxpooling layer, a fifth convolution block, a second convolution layer, and a customized network layer.

Further, each convolution block is composed of first to second convolution sub-layers (Convs), first to third batch normalization and activation sub-layer (BatchNormal+Relus), and a depth separable convolution sub-layer based on dilation convolution (SeparableConv+DilationConv).

Further, in a logical order, the convolution block sequentially includes a first convolution sub-layer (Conv), a first batch normalization and activation sub-layer (BatchNormal+Relu), a depth separable convolution sub-layer based on dilation convolution (SeparableConv+DilationConv), a second batch normalization and activation sub-layer (BatchNormal+Relu), a second convolution sub-layer (Conv), and a third batch normalization and activation sub-layer (BatchNormal+Relu).

Further, the CRNN algorithm also includes:

a recurrent neural network layer. The recurrent neural network layer includes two bidirectional-LSTM layers that are used for predicting characteristic vector sequences of the word to be recognized so as to obtain prediction results.

Further, the CRNN algorithm also includes:

a transcription layer used for decoding the prediction results into characters, and removing spacing characters and repetitive characters so as to obtain recognition results of the word to be recognized.

Further, acquiring the image of the word to be recognized includes:

setting a fixed-size rectangular region as a virtual pen tip according to a size of the word in the image with a position of a pen tip as a central point of a bottom edge;

calculating an overlapping area between the fixed-size rectangular region and each of text boxes that are detected; and finding a text box with an overlapping area that occupies a largest proportion of the fixed-size rectangular region, and using a word in the text box as the word to be recognized to obtain the image of the word to be recognized.

It will be noted that, the foregoing explanations of the embodiments of the word recognition method also apply to the non-volatile computer-readable storage medium of the embodiments, and details are not repeated herein.

When a translation pen adopting the non-volatile computer-readable storage medium of the embodiments of the present invention is used to recognize words, words that are not in the horizontal position, such as slanted or curved words, are stretched to the horizontal position, and then recognized. In this way, it may be possible to effectively improve the accuracy and the recognition effect of the word recognition, and thereby enhance the user experience. The present invention solves the technical problem in the prior art that the accuracy of text recognition needs to be further improved in a case where slanted, perspective or curved text makes words relatively illegible (for example, in application scenarios of point translation pens).

In the description, terms such as "one embodiment", "some embodiments", "example", "specific example", or "some examples" are intended to indicate that specific features, structures, materials or characteristics described in conjunction with the embodiment(s) or example(s) are included in at least one embodiment or example of the present invention. In the specification, schematic representations of the above terms do not necessarily refer to the same embodiments) or example(s). In addition, the specific features, structures, materials or characteristics may be combined in any suitable manner in any one or more embodiments or examples. Furthermore, in a case where there are no contradictions, those skilled in the art can combine different embodiments or examples, and features of different embodiments or examples described in the specification.

Furthermore, terms such as "first" and "second" are used for descriptive purposes only, and are not to be construed as indicating or implying the relative importance or implicitly indicating the number of indicated technical features. Therefore, a feature defined by the term "first" or "second" may include at least one of the features, either explicitly or implicitly. In the description of the present invention, a term "a plurality of", "the plurality of" or "multiple" means at least two, such as two or three, unless otherwise specified.

Any process or method in a flow chart or described herein in any other manners can be constructed as including one or more modules, fragments or portions of codes of executable instructions used for implementing steps to customize logic functions or processes. Scopes of the preferred embodiments of the present invention include other implementations, and functions may be performed out of the order shown or discussed, including in a substantially simultaneous manner or in a reverse order according to the functions involved. This will be understood by those skilled in the technical art to which the embodiments of the present invention belong.

Logics and/or steps indicated in the flow chart or described herein in other manners, for example, may be regarded as an sequence list of executable instructions used for implementing logic functions, and can specifically be implemented in any computer-readable medium for use in instruction execution systems, apparatuses or equipment (for example, computer-based systems, systems including a processor, or other systems that can fetch and execute instructions from instruction execution systems, apparatuses or equipment), or for use in combination with these instruction execution systems, apparatuses or equipment. With regard to this specification, a "computer-readable medium" may be any apparatus that are able to include, store, communicate, propagate or transmit a program for use in instruction execution systems, apparatuses or equipment or for use in combination with these instruction execution systems, apparatuses or equipment. More specific examples of the computer-readable medium (a non-exhaustive list) includes an electrical connection piece (electronic apparatus) with one or more cables, a portable computer disc box (magnetic apparatus), a random access memory (RAM), a read-only memory (ROM), an erasable programmable read-only memory (EPROM or flash memory), an optical fiber apparatus, and a compact disc read-only memory (CDROM), Furthermore, the computer-readable medium may even be paper on which the program can be printed or other appropriate media, since paper or other media can be, for example, optically scanned, and then edited, interpreted or processed in any suitable manner when necessary to obtain the program electronically, and then store it in a computer memory.

It will be understood that each part of the present invention can be implemented by hardware, software, firmware or combinations thereof. In the above embodiments, a plurality of steps or methods can be implemented by software or firmware that is stored in the memory and executed by suitable instruction execution systems. For example, the steps or methods may also be implemented by hardware as in another implementation manner by any one or combinations of the following technologies known in the art: a discrete logic circuit with a logic gate circuit used for implementing logic functions of data signals, an application specific integrated circuit with a suitable combinational logic gate circuit, a programmable gate array (PGA), a field programmable gate array (FPGA), etc.

A person of ordinary skill in the technical art will understand that, implementations of all or part of steps of the method described in the above embodiments can be completed by relevant hardware that is instructed by a program. The program can be stored in a computer-readable storage medium. When executed, the program implements one or a combination of steps of the method of the embodiments thereof.

Furthermore, functional units in the embodiments of the present invention can be integrated into a single processing module, or each unit can exist alone physically, or two or more units can be integrated into a single module. The integrated module may be implemented in a form of hardware or in a form of a software functional module. In a case where the integrated module is implemented in the form of a software functional module and is sold or used as an independent product, it may be stored in a computer-readable storage medium.

The storage medium may be a read-only memory, a magnetic disk or an optical disc. Although the embodiments of the present invention have been illustrated and described above, it can be understood that, the embodiments are exemplary and should not be construed as limitations on the present invention, and a person of ordinary skill in the art can make changes, modifications, substitutions or variants to the embodiments within the scope of the present invention.

What is claimed is:

1. A word recognition method, comprising:
   acquiring an image of a word to be recognized;
   recognizing edges of each character of the word to be recognized from the image of the word to be recognized;
   determining a geometric position of the word to be recognized;
   stretching the geometric position of the word to be recognized to a horizontal position; and
   recognizing the word to be recognized in the horizontal position;
   wherein acquiring the image of the word to be recognized includes:
   setting a fixed-size rectangular region as a virtual pen tip according to a size of the word in the image with a position of a pen tip as a central point of a bottom edge;
   calculating an overlapping area between the fixed-size rectangular region and each of text boxes that are detected;
   finding a text box with an overlapping area that occupies a largest proportion of the fixed-size rectangular region, and
   using a word in the text box as the word to be recognized to obtain the image of the word to be recognized.

2. The method according to claim 1, wherein recognizing the edges of each character of the word to be recognized from the image of the word to be recognized includes:
   determining the edges of each character of the word to be recognized by using a maximally stable extremal regions (MSER) algorithm.

3. The method according to claim 1, wherein determining the geometric position of the word to be recognized includes:
   determining an initial bounding box of the character according to the edges of the character;
   determining a position of a main axis by using a central point of the initial bounding box as a rotatory central point;
   continuously rotating and translating the main axis to determine boundaries;
   comparing areas of regions enclosed by the boundaries to obtain a minimum bounding box;
   establishing a coordinate system with any vertex of the image of the word to be recognized as an origin, a horizontal direction as an x axis, and a vertical direction as a y-axis;
   determining coordinates of four vertexes of the minimum bounding box in the coordinate system;
   determining edges in height and edges in width of the minimum bounding box according to the coordinates of the four vertexes, and using an angle between one of the edges in width and the x axis as an orientation angle of the character; and
   determining the geometric position of the word to be recognized according to orientation angles of all characters.

4. The method according to claim 3, wherein stretching the geometric position of the word to be recognized to the horizontal position includes:
   with a central point of the minimum bounding box as a central point of the character, connecting central points of all characters in order from left to right to obtain a central line of text;
   sampling a plurality of central points at equal intervals on the central line of the text;
   selecting a point on each of two edges in height in an orientation of a character corresponding to each sampled central point as a base point; and
   calculating a thin-plate spline (TPS) interpolation transformation matrix based on base points; and
   performing bilinear interpolation sampling to stretch the geometric position of the word to the horizontal position.

5. The method according to claim 1, wherein recognizing the word to be recognized in the horizontal position includes:
   recognizing the word to be recognized in the horizontal position by a convolutional recurrent neural network (CRNN) algorithm.

6. The method according to claim 5, wherein before recognizing the word to be recognized in the horizontal position by the CRNN algorithm, the method further includes:
   scaling the image of the word to be recognized in the horizontal position to a preset height and a preset width.

7. The method according to claim 6, wherein the CRNN algorithm includes:
   a convolutional neural network layer, the convolutional neural network layer including first and second convolution layers, first to fifth convolution blocks, first to fourth maxpooling layers, and a customized network layer, wherein characteristic vector sequences of the word to be recognized in the scaled image are extracted through the first and second convolution layers and the first to fifth convolution blocks, the characteristic vector sequences being used for recognizing the word.

8. The method according to claim 7, wherein the CRNN algorithm further includes:
   a recurrent neural network layer, the recurrent neural network layer including two bidirectional long short-term memory (LSTM) layers that are used for predicting characteristic vector sequences of the word to be recognized so as to obtain prediction results.

9. The method according to claim 8, wherein the CRNN algorithm further includes:

a transcription layer for decoding the prediction results that are generated by the recurrent neural network layer into characters, and removing spacing characters and repetitive characters so as to obtain recognition results of the word to be recognized.

10. An electronic apparatus, comprising a memory, a processor, and a computer program that is stored on the memory and executable on the processor, wherein when the processor executes the program, a word recognition method is implemented, including:
  acquiring an image of a word to be recognized;
  recognizing edges of each character of the word to be recognized from the image of the word to be recognized;
  determining a geometric position of the word to be recognized;
  stretching the geometric position of the word to be recognized to a horizontal position; and
  recognizing the word to be recognized in the horizontal position;
  wherein acquiring the image of the word to be recognized includes:
  setting a fixed-size rectangular region as a virtual pen tip according to a size of the word in the image with a position of a pen tip as a central point of a bottom edge;
  calculating an overlapping area between the fixed-size rectangular region and each of text boxes that are detected;
  finding a text box with an overlapping area that occupies a largest proportion of the fixed-size rectangular region; and
  using a word in the text box as the word to be recognized to obtain the image of the word to be recognized.

11. The electronic apparatus according to claim 10, wherein recognizing the edges of each character of the word to be recognized from the image of the word to be recognized includes:
  determining the edges of each character of the word to be recognized by using a maximally stable extremal regions (MSER) algorithm.

12. The electronic apparatus according to claim 10, wherein determining the geometric position of the word to be recognized includes:
  determining an initial bounding box of the character according to the edges of the character;
  determining a position of a main axis by using a central point of the initial bounding box as a rotatory central point;
  continuously rotating and translating the main axis to determine boundaries;
  comparing areas of regions enclosed by the boundaries to obtain a minimum bounding box;
  establishing a coordinate system with any vertex of the image of the word to be recognized as an origin, a horizontal direction as an x axis, and a vertical direction as a y-axis;
  determining coordinates of four vertexes of the minimum bounding box in the coordinate system;
  determining edges in height and edges in width of the minimum bounding box according to the coordinates of the four vertexes, and using an angle between one of the edges in width and the x axis as an orientation angle of the character; and
  determining the geometric position of the word to be recognized according to orientation angles of all characters.

13. The electronic apparatus according to claim 12, characterized in that stretching the geometric position of the word to be recognized to the horizontal position includes:
  with a central point of the minimum bounding box as a central point of the character, connecting central points of all characters in order from left to right to obtain a central line of text;
  sampling a plurality of central points at equal intervals on the central line of the text;
  selecting a point on each of two edges in height in an orientation of a character corresponding to each sampled central point as a base point;
  calculating a thin-plate spline (TPS) interpolation transformation matrix based on base points; and
  performing bilinear interpolation sampling to stretch the geometric position of the word to the horizontal position.

14. The electronic apparatus according to claim 12, wherein recognizing the word to be recognized in the horizontal position includes:
  recognizing the word to be recognized in the horizontal position by a convolutional recurrent neural network (CRNN) algorithm.

15. The electronic apparatus according to claim 14, wherein the program, when being executed by the processor, further performs: before recognizing the word to be recognized in the horizontal position by the CRNN algorithm, scaling the image of the word to be recognized in the horizontal position to a preset height and a preset width.

16. The electronic apparatus according to claim 15, wherein the CRNN algorithm includes:
  a convolutional neural network layer, the convolutional neural network layer including first and second convolution layers, first to fifth convolution blocks, first to fourth maxpooling layers, and a customized network layer, wherein characteristic vector sequences of the word to be recognized in the scaled image are extracted through the first and second convolution layers and the first to fifth convolution blocks, the characteristic vector sequences being used for recognizing the word.

17. The electronic apparatus according to claim 16, wherein the CRNN algorithm further includes:
  a recurrent neural network layer, the recurrent neural network layer including two bidirectional long short-term memory (LSTM) layers that are used for predicting characteristic vector sequences of the word to be recognized so as to obtain prediction results; and/or,
  a transcription layer for decoding the prediction results that are generated by the recurrent neural network layer into characters, and removing spacing characters and repetitive characters so as to obtain recognition results of the word to be recognized.

18. A non-transitory computer-readable storage medium having stored a computer program thereon, wherein when the program is executed by a processor, the word recognition method according to claim 1 is implemented.

* * * * *